(12) United States Patent  
Yang

(10) Patent No.: US 9,063,619 B2  
(45) Date of Patent: Jun. 23, 2015

(54) VOLTAGE-BASED CAPACITIVE TOUCH DEVICE AND TOUCH SENSING METHOD THEREOF

(75) Inventor: Shih-Tsung Yang, Taipei (TW)

(73) Assignee: Senmatrix Semiconductor, Inc., Taipei (TW)

( * ) Notice: Subject to any disclaimer, the term of this patent is extended or adjusted under 35 U.S.C. 154(b) by 469 days.

(21) Appl. No.: 13/420,622

(22) Filed: Mar. 15, 2012

(65) Prior Publication Data

US 2013/0135248 A1     May 30, 2013

(30) Foreign Application Priority Data

Nov. 25, 2011   (TW) .............................. 100143402 A

(51) Int. Cl.
G06F 3/044     (2006.01)
G06F 3/041     (2006.01)

(52) U.S. Cl.
CPC .............. *G06F 3/044* (2013.01); *G06F 3/0416* (2013.01)

(58) Field of Classification Search
USPC ........................................ 345/173, 174, 204
See application file for complete search history.

(56) References Cited

U.S. PATENT DOCUMENTS

| | | | |
|---|---|---|---|
| 8,378,981 B2 * | 2/2013 | Yilmaz et al. ................. | 345/173 |
| 2009/0237372 A1 * | 9/2009 | Kim et al. ..................... | 345/173 |
| 2010/0073301 A1 * | 3/2010 | Yousefpor et al. ............ | 345/173 |
| 2011/0069034 A1 * | 3/2011 | Yokota et al. ................. | 345/174 |
| 2011/0267309 A1 * | 11/2011 | Hanauer et al. ............... | 345/174 |

* cited by examiner

*Primary Examiner* — Srilakshmi Kumar
*Assistant Examiner* — Linh N Hoffner
(74) *Attorney, Agent, or Firm* — CKC & Partners Co., Ltd.

(57) ABSTRACT

A touch sensing method suitable for a voltage-based capacitive touch device is disclosed. The voltage-based capacitive touch device includes a conductive sensing plane and a plurality of electrodes. The touch sensing method includes steps of: providing pre-determined driving signals to the electrodes, so as to form various types of voltage fields on the conductive sensing plane; measuring, at different time points, the charge quantity stored on the conductive sensing plane for each of the voltage fields, so as to provide a plurality of charge-storage measurement results; estimating whether or not a touch event occurs according to the charge-storage measurement results; and, calculating coordinates of touch inputs according to the charge-storage measurement results if the touch event occurs.

12 Claims, 4 Drawing Sheets

VOLTAGE-BASED CAPACITIVE TOUCH DEVICE AND TOUCH SENSING METHOD THEREOF

RELATED APPLICATIONS

This application claims priority to Taiwan Application Serial Number 100143402, filed Nov. 25, 2011, which is herein incorporated by reference.

BACKGROUND

1. Field of Invention

The present invention relates to a touch sensing device and method thereof. More particularly, the present invention relates to a touch sensing is device and method capable of sensing touched position(s) from various types of touch-input objects, such as fingers and styli.

2. Description of Related Art

Recently, various types of touch-sensing techniques, such as resistive touch sensors, capacitive touch sensors, surface acoustic wave touch sensor and infrared touch sensors, are popular and well developed in many applications.

The resistive touch-sensing technique determines a touched position by measuring a voltage (or potential) corresponding to the touched position. The voltage, corresponding to the touched position, can be measured when top and bottom conductive layers of the resistive sensor panel contact with each other at the touched position due to the touch pressure.

There are two common types of capacitive touch sensing techniques. One of them is the Surface Capacitive Touch (SCT) panel, and the other one is the Projective Capacitive Touch (PCT) panel.

The Surface Capacitive Touch panel detects the touched position based on the measurement of the resistance(s) between the touched position and the sensor electrode(s). The measured resistance is proportional to the distance between the touched position and the sensor electrode. Based on aforesaid proportional relationship, the touched position can be determined by calculating the resistance values seen from the sensor electrode(s).

The Projective Capacitive Touch technique requires multiple sensors placed beneath the cover glass to detect a touch input. Reference is made to FIG. 1, which is a schematic diagram illustrating a Projective Capacitive Touch is panel 100 in prior art. As shown in FIG. 1, the sensor of the Projective Capacitive Touch panel 100 has a conductive path pattern formed by a transparent conductive material, such as Indium Tin Oxide (ITO). The conductive path pattern is normally called the ITO pattern. The allocation of the conductive path pattern needs to be planned carefully. As shown in FIG. 1, the Projective Capacitive Touch panel 100 includes conductive traces 120 in direction X and conductive traces 140 in direction Y. The Projective Capacitive Touch technique measures the capacitance change due to the input device (such as the fingers) being close to the sensors. The capacitance change seen by a single sensor can determine whether or not a touch action happens at the location of the sensor. To determine the touched position, the capacitance changes seen by multiple sensors (or all sensors) are required. The touched position can be calculated on a basis of interpolation. The calculation of the interpolation is performed based on the distribution of the capacitance changes among those sensors which are claimed to be touched.

The Surface Acoustic Wave (SAW) technology consists of transducers (for transmitting and receiving), reflectors and a controller. The controller sends the signal to the transducer for converting the electrical signals to the ultrasonic waves. The ultrasonic wave is then transmitted to the reflectors for rectifying the waves to the receiving transducers. When a finger touches the screen, some energy of the wave is absorbed so that the touch event can be detected by analyzing the waves received at the transducer.

The infrared touch panel consists of the light-emitting diodes (LEDs), photo sensors and a controller. The controller sends the signals to the light-emitting diodes, so as to drive the light-emitting diodes for emitting infrared beams. The photo sensors are used for detecting the infrared beams. When an object (e.g., a finger or stylus) touches the infrared touch panel, at least a part of the infrared beams are blocked or absorbed. The touch event can be positioned by analyzing the changes of the received signals at the corresponding photo sensors.

SUMMARY

This disclosure provides the touch sensing method as well as the device to determine the touch position. The touch sensing method utilizes the capacitive sensing technique to measure the amount of the charge-storage change due to the touch event. This amount of the charge-storage change is referred as the increment of stored charge quantity. The touched locations can be derived from the measurements of the increment of stored charge quantity. In an embodiment of the invention, the measurements are to get the total stored charge quantity on the conductive sensing plane. Due to the touch event, the additional charge will be stored, such that the total stored charge quantity will increase. The amount of the additional charge being stored depends on the voltages between the touched points and the corresponding locations of the sensor plane (i.e., the points on the sensor plane right below the touched points). By applying the various types of voltage fields, the increments of the to stored charge quantity (corresponding to each voltage field) on the sensor plane can be measured and hence the touched positions can be determined.

An aspect of the invention is to provide a voltage-based capacitive touch device, which includes a conductive sensing plane, a plurality of electrodes, a field generator unit, a charge-storage measurement unit and a position is estimation unit. The electrodes are disposed on the conductive sensing panel respectively. The field generator unit is coupled to the electrodes. The field generator unit is used for providing the pre-determined driving signals to the electrodes, so as to form various types of voltage fields on the conductive sensing plane. The charge-storage measurement unit is coupled to at least a part of the electrodes. The charge-storage measurement unit is used for measuring the amount of the charges stored on the conductive sensing plane with respect to the applied voltage field. Each voltage field will result in their corresponding charge-storage quantity. The charge-storage measurement unit generates a plurality of charge-storage measurement results under various voltage fields at different time points. By those charge-storage measurement results, the position estimation unit estimates whether or not a touch event occurs, as well as calculates touch input coordinates of the touch event if the touch event occurs.

According to an embodiment of the invention, the field generator unit builds at least two types of the voltage fields, where at least one voltage field is established by allowing the current flows among the electrodes.

According to an embodiment of the invention, the field generator unit includes a static DC (direct current) driving circuit or a quasi-static DC driving circuit. The outputs of those driving circuits are coupled to the electrodes. The field generator unit generates various types of the voltage fields by adjusting driving voltages (or currents) of the static DC driving circuit or the quasi-static DC driving circuit to the electrodes.

According to an embodiment of the invention, the various types of the voltage fields are predetermined.

According to an embodiment of the invention, the connections, between the electrodes and the DC driving circuit of the field generation unit, are open when the charge-storage measurement unit measures the charge storage on the conductive sensing plane.

According to an embodiment of the invention, the voltage fields established by the field generator unit will become an equipotential field after the connections between the electrodes and driving circuits are open.

According to an embodiment of the invention, the electrodes are disposed on and around the conductive sensing plane respectively.

According to an embodiment of the invention, main sensing area of the conductive sensing plane is a complete electrically conductive plane without any etching process to form the special conductive pattern (such as ITO pattern).

According to an embodiment of the invention, in order to calculate the touch input coordinates of the touch event, at least two different types of the voltage fields are required. The charge-storage measurement results, corresponding to the different types of the voltage fields, from the charge-storage measurement unit are also required. The charge-storage measurements, corresponding to each voltage field, should be performed from time to time.

Another aspect of the invention is to provide a touch sensing method suitable for a voltage-based capacitive touch device. The voltage-based capacitive touch device includes a conductive sensing plane and a plurality of electrodes. The touch sensing method includes steps of: providing the pre-determined driving signals to the electrodes so as to form various types of voltage fields on the conductive sensing plane; measuring the amount of the charge quantity stored on the conductive sensing plane under each voltage field at different time points, so as to generate a plurality of charge-storage measurement results; and, estimating whether or not a touch event occurs according to the charge-storage measurement results at different time points, and calculating touch input coordinates of the touch event according to the charge-storage measurement results if the touch event occurs.

According to an embodiment of the invention, at least two types of the voltage fields are formed on the conductive sensing plane, and at least one voltage field is established by allowing the current flow among the electrodes.

According to an embodiment of the invention, the outputs of the static DC driving circuits or quasi-static DC driving circuits are coupled to the electrodes. Various types of the voltage fields are generated by adjusting driving voltages (or currents) of the static (or quasi-static) DC driving circuits to the electrodes.

According to an embodiment of the invention, the various types of the voltage fields are predetermined.

According to an embodiment of the invention, the connections between the electrodes and the outputs of driving circuits are open when the charge-storage measurement starts.

According to an embodiment of the invention, the previously established voltage field will become an equipotential voltage field after the connections between the electrodes and the driving circuits are open.

According to an embodiment of the invention, in step of calculating the touch input coordinates of the touch event, at least two different types of the voltage fields are required. The charge-storage measurement results corresponding to each voltage field, at different time points, are also required.

BRIEF DESCRIPTION OF THE DRAWINGS

The invention can be more fully understood by reading the following detailed description of the embodiment, with reference to the accompanying drawings explained as follows.

DETAILED DESCRIPTION

Figure 1:
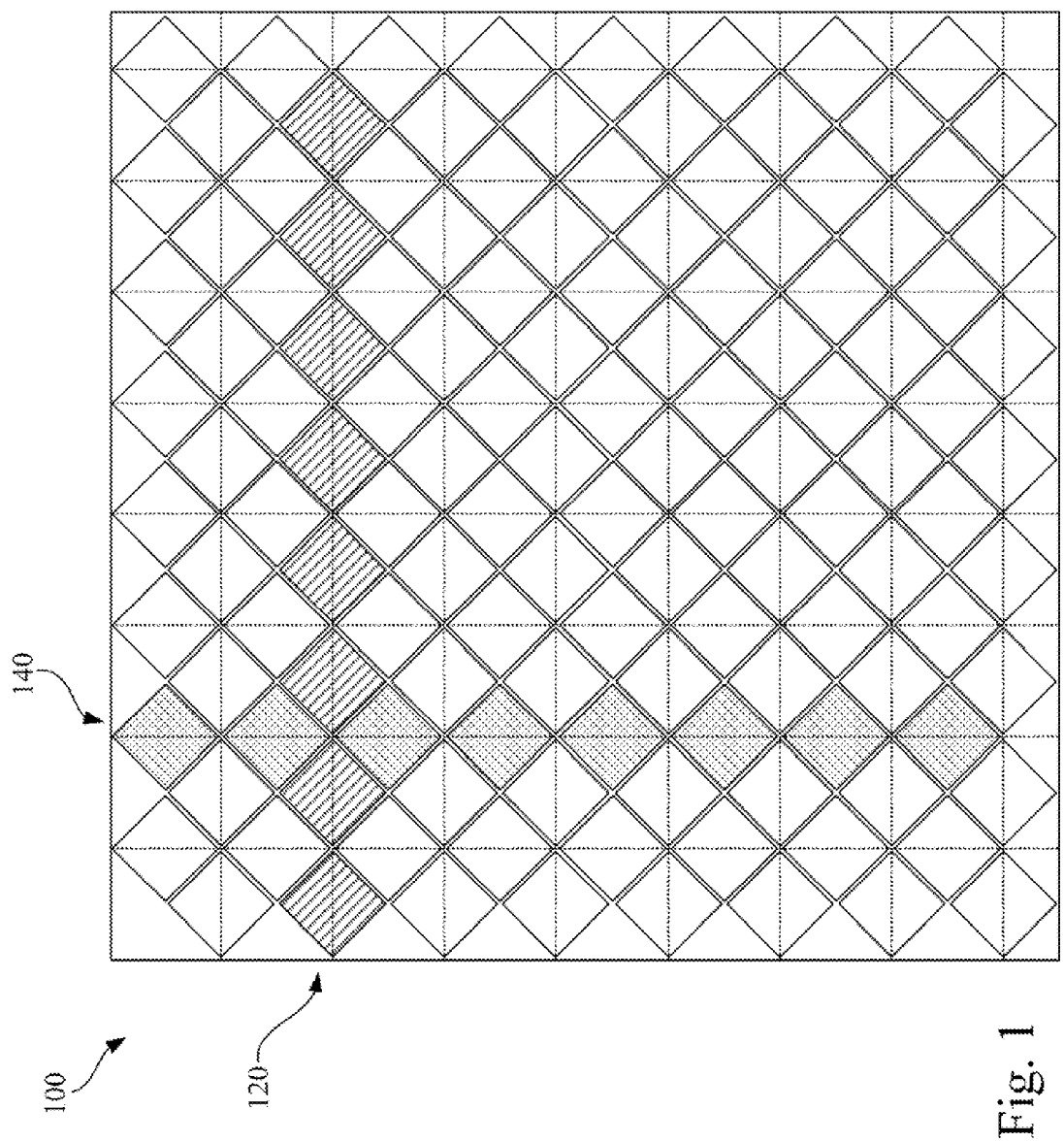
FIG. 1 is a schematic diagram illustrating a Projective Capacitive Touch panel in prior art.

The present disclosure is more particularly described in the following examples that are intended as illustrative only since numerous modifications and variations therein will be apparent to those skilled in the art. Various embodiments of the disclosure are now described in detail. The present disclosure is not merely limited to the embodiments below. Descriptions of circuitry structures, panel allocations and computing method disclosed in following embodiments are not used for claiming any absolute relationship between components within the invention. Re-combinations of the circuitry structures and the panel allocations, or equivalent designs with similar functions are also in the scope of the invention. Referring to the drawings, the components indexed by the same number have the same or similar functionalities throughout the figures. Certain terms that are used to describe the disclosure are discussed below, or elsewhere in the specification, for providing additional guidance to the practitioner regarding the description of the disclosure. Furthermore, some components or steps well known to a person in the art are not described in following embodiments, so as to avoid unnecessary limitation to the present invention.

Figure 2:
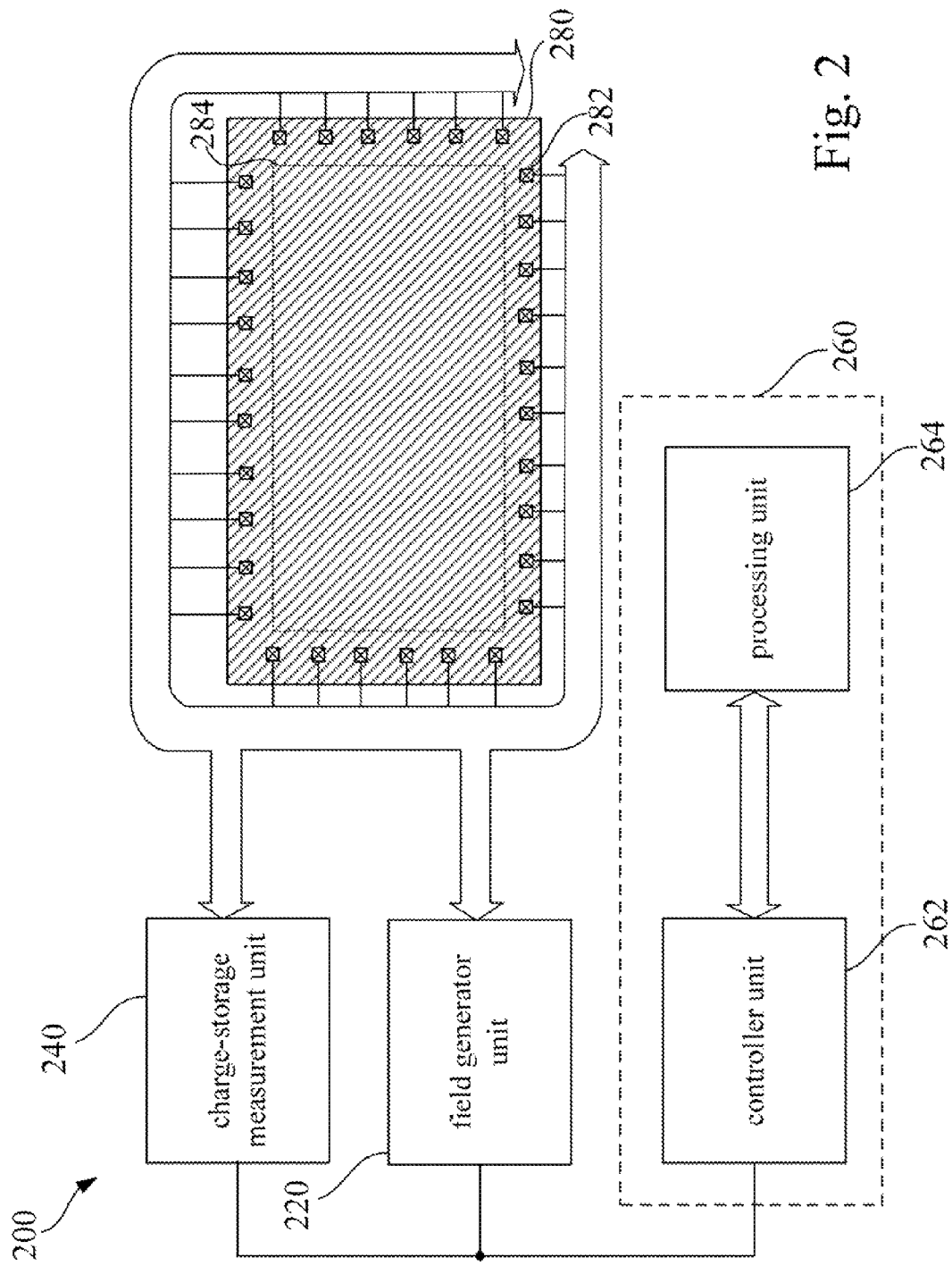
FIG. 2 is a schematic diagram illustrating a voltage-based capacitive touch device according to an embodiment of the invention.

FIG. 2 is a schematic diagram illustrating a voltage-based capacitive touch device 200 according to an embodiment of the invention. As shown in FIG. 2, the voltage-based capacitive touch device 200 includes a field generator unit 220, a charge-storage measurement unit 240, a position estimation unit 260 and a conductive sensing plane 280. In the embodiment, there is a plurality of electrodes 282 disposed on the conductive sensing plane 280.

The field generator unit 220 is coupled to the electrodes 282. The field generator unit 220 is used for providing the pre-determined driving signals to the electrodes 282, so as to form various types of voltage fields (or potential fields) on the conductive sensing plane 280.

The charge-storage measurement unit 240 is coupled to at least a part of the electrodes 282. The charge-storage measurement unit 240 is used for measuring the charges stored on the conductive sensing plane 280 to generate a plurality of charge-storage measurement results at different time points according to various types of the voltage fields.

Then, the charge-storage measurement results generated by the charge-storage measurement unit 240 are sent to the position estimation unit 260. Based on those measurement results, the position estimation unit 260 determines whether or not a touch event occurs. If the touch event occurs, the position estimation unit 260 further calculates touch input coordinates of the touch event according to the charge-storage measurement results.

In practical applications, the position estimation unit 260 may include a controller unit 262 and a processing unit 264, but the invention is not limited to this structure. In an embodiment, the controller unit 262 in one aspect is responsible for issuing the commands to the field generator unit 220 to generate the various pre-determined voltage fields. The controller unit 262 in another aspect is to collect the charge-storage measurement results generated by the charge-storage measurement unit 240 as well as to perform a preliminary judgment about whether a touch event occurs or not. When the occurrence of the touch event is confirmed by the controller unit 262, the charge-storage measurement results are transmitted from the controller unit 262 to the processing unit 264 for further positioning processing to calculate the coordinates of the touch event.

Based on the commands from the controller unit 262, the field generator unit 220 provides the pre-determined driving signals (e.g., driving signals with specific voltage levels or current amplitudes) to the selected electrodes of the to electrodes 282 on the conductive sensing plane 280. By the assignment of the voltage levels (or current amplitudes) to the selected electrodes, the predetermined voltage field will be formed on the conductive sensing plane 280. According to Maxwell Equations of Electromagnetic Theory, the voltage field formed on the conductive sensing plane 280 can be uniquely determined. By solving the Maxwell equations under the case of a static electrical field, the voltage field on the conductive sensing plane can be pre-determined.

In the embodiment, the field generator unit 220 builds at least two types of the voltage fields on the conductive sensing plane 280 where at least one voltage field is established by allowing current flow(s) among the electrodes 282.

In addition, the field generator unit 220 includes a static direct current (DC) driving circuit or a quasi-static DC driving circuit coupled to the electrodes 282. The field generator unit 220 generates various types of the voltage fields by assigning pre-determined driving voltages (currents) of the static (or quasi-static) DC driving circuit to the electrodes 282, so as to generate the predetermined voltage fields.

The charge-storage measurement unit 240 is used for measuring the quantity of the charges stored on the conductive sensing plane 280. The charge-storage measurement unit 240 provides a digitized number for the measured charge storage. The digitized number of the measured charge storage is then transmitted to the controller unit 262. It is noted that, the connections between the electrodes 282 and the static (or quasi-static) DC driving circuit of the field generator unit 220 should be open when the charge-storage measurement unit 240 performs the charge-storage measurements. In other words, the driving signals, from the field generator unit 220, are no longer provided to the electrodes 282. Therefore, the voltage fields established by the field generator unit 220 shall become an equipotential voltage field after starting the charge-storage measurements.

Figure 3:
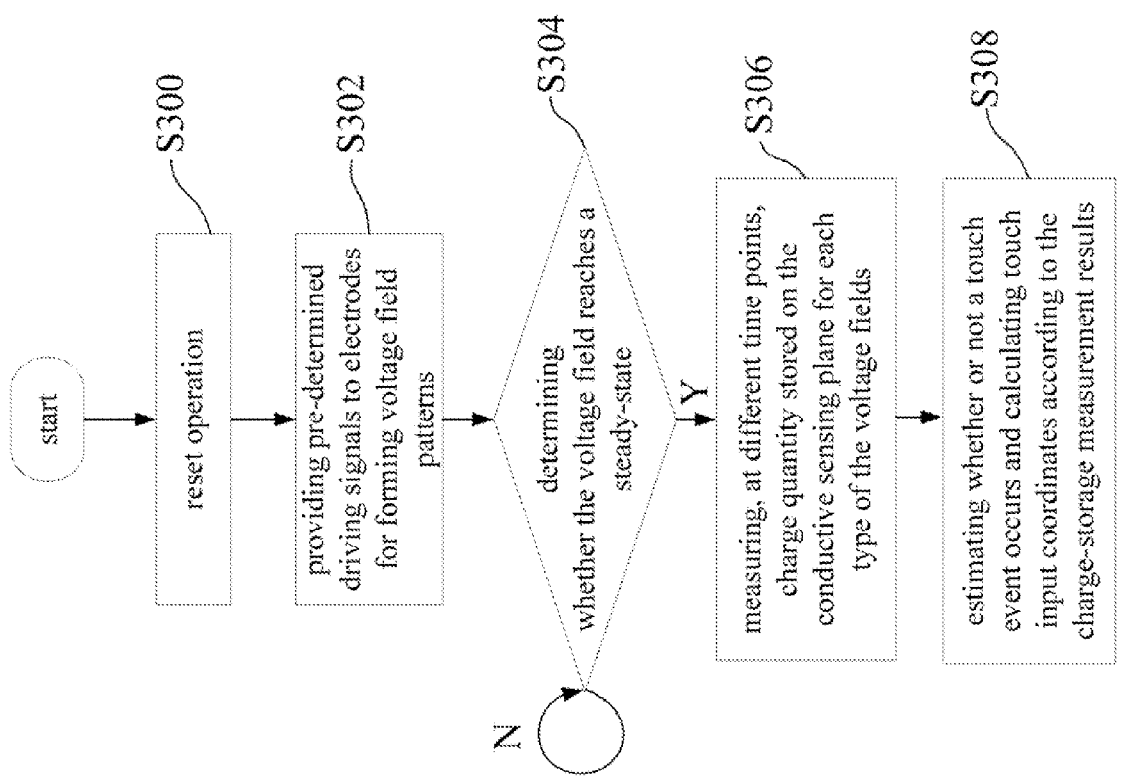
FIG. 3 is a flowchart illustrating a touch sensing method according to an embodiment of the invention.

FIG. 3 is a flow chart illustrating a touch sensing method according to an embodiment of the invention. The touch sensing method can be applied on the voltage-based capacitive touch device 200 or any other equivalent touch devices.

As shown in FIG. 3, step S302 of the touch sensing method can be performed for providing pre-determined driving signals from the field generator unit 220 to the electrodes 282, so as to form various types of voltage fields on the conductive sensing plane 280.

Afterward, step S304 is performed for determining whether or not the voltage field reaches a steady-state on the conductive sensing plane 280. Whether or not the steady state is reached can be determined by either one of the following solutions:

(1) Predetermined waiting time:
Different voltage fields require different waiting times for the voltage fields to be stabilized. The pre-determined waiting time is a set of parameters where each parameter corresponds to the stabilization time of the respective voltage field. The predetermined waiting time can be configured or set during the manufacture of the touch device or during the power-on calibration or periodic on-line calibration of the touch device. The voltage fields on the conductive sensing plane 280 are considered to reach the steady-state after the corresponding predetermined waiting time. If a single parameter of representing the waiting time is preferred, it can be set to the maximum of all the necessary waiting times with respect to each of the voltage fields.

(2) Repetitive measurements of the charge storage:
Measurements are performed repetitively until the measurement results converge, i.e., the measurement results approach the same value. In addition, the stabilization (waiting) time for each measurement run of the repetitive measurements can be increased gradually.

(3) Hybrid of the above two means:
At the first time of performing the charge-storage measurement, the approach "Repetitive Measurements" is adopted for estimating the required stabilization time. This stabilization time is taken as the pre-determined waiting time. Then the approach "Pre-determined waiting time" is used. The stabilization time can be updated periodically if desired.

Afterward, step S306 is performed for measuring the quantity of charges stored on the conductive sensing plane 280 under various types of the voltage fields. Those measurements are performed from time to time by the charge-storage measurement unit 240. Thus a plurality of charge-storage measurement results can be generated.

Before the step S306 starts the measurement, the connections, between the electrodes 282 and the field generator unit 220, should be open. After the to connections are open, the originally established voltage field should become an equipotential voltage field.

In addition, step S302 to step S306 can be performed respectively in a loop cycle. At one time point, one type of voltage field can be applied on the conductive sensing plane to generate the measurement result. At the next time point, another type of voltage field can be applied on the conductive sensing plane to generate another measurement result. Multiple outcomes, at different time points, of the measurement results under various types of the voltage fields are generated independently in a loop cycle. In other words, at one time point, only one voltage field is applied on the conductive sensing plane and one charge-storage measurement result is associated with that voltage field.

According to those charge-storage measurement results, step S308 is performed for estimating whether or not a touch event occurs. If the touch event occurs, the position estimation unit 260 may calculate touch input coordinate(s) of the touch event according to the charge-storage measurement results. In order to calculate the touch input coordinate(s) of the touch event, at least two different types of the voltage fields are required. And the associated charge-storage measurement results (with respect to the voltage fields) at different time points are also required.

The touch sensing method shown in FIG. 3 in the embodiment may further include step S300 before step S302. Step S300 is for a reset operation. The reset operation is used for releasing the residual charges due to the previously applied voltage field. In practical applications, the reset operation can be realized by coupling the electrodes 282 to a system ground or a fixed voltage level. The reset operation performed in step S300 is optional. If the steady-state voltage field can be precisely formed on the conductive sensing plane 280, whether or not the reset operation is performed will not affect the measurement results. Step S300 of the reset operation is preferable when the approach "Predetermined waiting time" is used in step S304.

Figure 4:
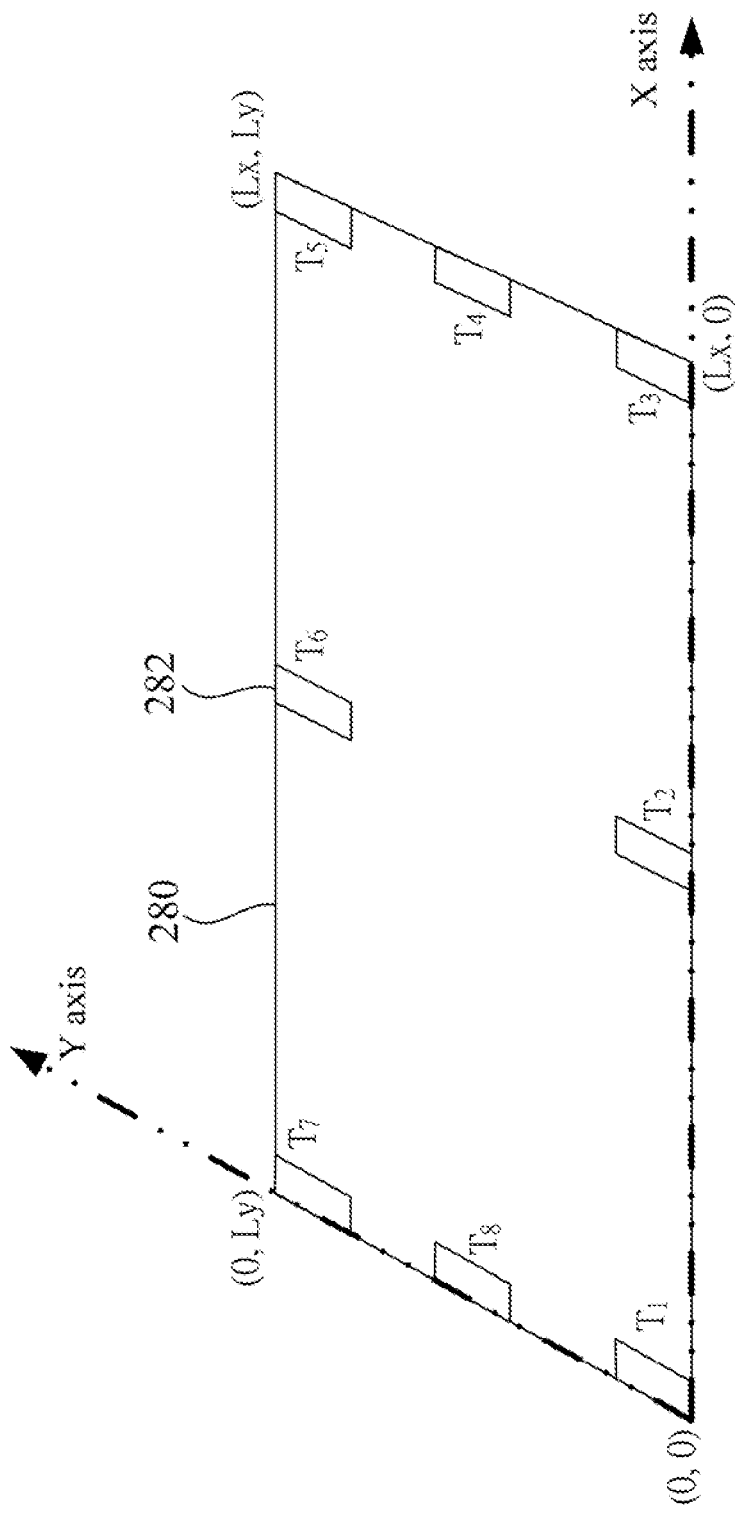
FIG. 4 is a schematic diagram illustrating the conductive sensing plane and the electrodes according to the operational example of the disclosure.

An operational example is used for illustrating how the touch sensing method disclosed in the invention calculates the touch input coordinates of a touch event according to the charge-storage measurement results of the voltage-based capacitive touch device 200. FIG. 4 is a schematic diagram illustrating the conductive sensing plane 280 and the electrodes 282 according to the operational example of the disclosure. In the operational example, the electrodes 282 disposed on the conductive sensing plane 280 consist of eight electrodes labeled as electrodes $T_1, T_2, T_3 \ldots T_8$. The electrodes $T_1, T_2, T_3, \ldots T_8$ are disposed around the four sides of the conductive sensing plane respectively. In addition, for the sake of simplicity, the shielding layer and cover glass existed on common touch panels are not shown in FIG. 4. In facts, the shielding layer is not an essential component of the touch device in the invention. In practical applications, a touch device including the shielding layer may have a better signal-to-noise ratio (SNR). The conductive sensing plane 280 can be made of a transparent conductive material, such as an Indium Tin Oxide (ITO) film.

In the operational example, the main sensing area 284 of the conductive sensing plane 280 is a complete electrically conductive plane without any etching process or conductive patterning process, i.e., without any ITO pattern. Therefore, the conductive sensing plane 280 in the operational example is different from a traditional projective capacitive touch panel requiring multiple-masked etching process for forming specific ITO patterns.

It is noted that, the operational example in FIG. 4 is only for the purpose of the illustration regarding how this invention works. The architecture shown in FIG. 4 is not the only physical structure which this invention can be applied to. For example, the function disclosed in the invention may still work when there are more or less than eight electrodes disposed on the conductive sensing plane 280, or when the eight electrodes are disposed at locations different from FIG. 4.

Referring to FIG. 4, different voltages can be fed to the electrodes $T_1 \sim T_8$.

If the shielding layer exists, either one of the following operation modes can be done to the shielding layer. In one operation mode, the shielding layer can be fed with a common voltage level. This common voltage level can be any voltage from 0V (ground level) to the supply voltage.

In another operation mode, the shielding layer can also have the same electrode arrangement as the conductive sensing plane 280. The electrodes at the shielding layer can be fed by the same voltages as the ones at the conductive sensing plane 280 do. Applying the same voltage field at the shielding layer will help reducing the charges stored at the conductive sensing plane 280 (because of the capacitance between the conductive sensing plane 280 and the shielding layer). By doing so, the stored charge quantity on the conductive sensing plane 280 due to the shielding layer can be reduced significantly. Therefore, the increment of the stored charge quantity, due to the to touch event, will have the more percentage over the total stored charge quantity of the conductive sensing plane 280. Hence, the accuracy of estimating the touched positions can be improved.

The $(D_1, D_2 \ldots, D_8)$ is the driving vector to the electrodes $T_1 \sim T_8$, where $D_i$ is the driving voltage to the electrode $T_i$, i=1, 2, 3, ..., 8. If the electrode $T_i$ is not connected with the driving supply or is not driven, the driving voltage of the electrode $T_i$ is represented by the notation "OPEN". It is assumed that, the number of the available driving vectors be M. Obviously, M can be much larger than the number of the electrodes. It is assumed that, $E_i$ is the i-th driving vector, where the variable i is from 1 to M.

Let (x, y) represent the coordinate system shown in FIG. 4. $V_k$ represents the unknown voltage level of the touch input object indexed by "k" (e.g., a finger or stylus).

The notation $V_i^{(n)}(x,y)$ represents the voltage field when the driving vector is n times of Ei (i.e., n×Ei). The notation $V_i(x,y)$ represents the voltage field when the driving vector is Ei. Clearly, $V_i^{(1)}(x,y)$ is equal to $V_i(x,y)$. The notation a $Q_i^{(n)}$ represents the charge quantity stored on the conductive sensing plane 280 when the driving vector is n×Ei.

It is noted that, due to the linearity of the conductive sensing plane 280, the following equation holds: $V_i^{(n)}(x,y)=n\times V_i(x,y)$.

Different driving vectors will result in the different amounts of the charge quantity stored on the conductive sensing plane 280. The amount of the stored charge quantity can be measured by the charge-storage measurement unit 240, so as to generate a digitized number for representing the measured to charge quantity.

The equation of linking the charge quantity $Q_i(n)$ and the touch event can be written in terms of the following equation:

$$Q_i^{(n)} = P_i^{(n)} + \sum_{k=1}^{N} C_k \{V_i^{(n)}(x_k, y_k) - V_k\}.$$

In the above equation, the notation $P_i^{(n)}$ is the measured charge storage when no touch event occurs on the screen of the conductive sensing plane 280. The notation $C_k$ represents the capacitance between the k-th touch object and the conductive sensing plane 280. The coordinate $(x_k, y_k)$ represents the touched position of the k-th touch input. Notations $Q_i$ and $P_i$ follow the relationships of: $Q_i=Q_i^{(2)}-Q_i^{(1)}$ and $P_i=P_i^{(2)}-P_i^{(1)}$. Therefore, the following equation can be derived:

$$Q_i=P_i+\Sigma_{k=1}^{N}C_k V_i(x_k,y_k)$$

It is noted that, by doing the subtraction, the effect of the unknown voltage levels (unknown parameter $V_k$'s) can be eliminated. The $P_i$ can be obtained by the on-line measurement of the charge storage when no touch event occurs on the conductive sensing plane 280. If no on-line measurement results are available, then the pre-stored values can be used. Introduce the notation $\overline{Q_i}$ where $\overline{Q_i}=Q_i-P_i$. $\overline{Q_i}$ can be obtained based on the measurement results generated by the charge-storage measurement unit 240. Therefore, aforesaid equation can be re-written as follows:

$$EQ(1): \overline{Q_i} = \sum_{k=1}^{N} C_k V_i(x_k, y_k),$$

where i=1, 2, 3 ... M.

The meaning of $\overline{Q_i}$ is the increment of the stored charge quantity on the conductive sensing plane 280 due to the touch event (e.g., finger contacts). Based on aforesaid equation EQ(1), the capacitance $C_k$ and the coordinates of the touch inputs can be calculated. Note again that $(x_k, y_k)$ represents the touched position of the k-th touch input, where k is from 1 to N.

The following computing example is used to illustrate how to derive the touched positions from the increments a $\overline{Q_i}$'s.

This computing example is a single touch-point sensing system utilizing three types of voltage fields listed below for calculating the touch input coordinate of the touch event.

The first type of voltage fields is $V_i(x,y)=1$, which is an equipotential voltage field. The equipotential voltage field can be established by connecting one of the electrodes $T_1 \sim T_8$ to 1 Volt and keeping the other electrodes floating (open).

The second type of voltage fields is $V_2(x,y)=k \cdot x$, which is a linear field along with the x-direction. The k is a known constant equal to $1/L_x$ where the $L_x$ is the length of the conductive sensing plane 280 in x-direction.

The third type of voltage field is $V_a(x,y)=k \cdot y$, which is a linear field along with the y-direction. The k is a known constant equal to $1/L_y$ where the $L_y$ is the width of the conductive sensing plane 280 in y-direction.

Based on EQ(1), the touch input coordinate and the capacitance due to the touch event are:

$$C_1 = \overline{Q_1}, \quad x_1 = \frac{L_x \cdot \overline{Q_2}}{\overline{Q_1}},$$

and $$y_1 = \frac{L_y \cdot \overline{Q_3}}{\overline{Q_1}}.$$

The above computing example illustrates how to derive the touch input coordinate. To realize a multiple touch-points sensing system, the minimum variance method can be adopted to calculate the coordinates of multiple touch-points based on the equation EQ(1) under various types of voltage fields.

In summary, this disclosure provides a touch sensing method to determine the touched positions. The touch sensing method utilizes the capacitive sensing technique to measure the change of the charge-storage due to the touch event. This change of the charge-storage can be referred as the increment of stored charge quantity. The touched locations can be derived from the measurements of the increment of stored charge quantity. In an embodiment of the invention, the measurements measure the total stored charge quantity on the conductive plane (due to the capacitance between the input devices (e.g., fingers or styli) and the sensor plane (e.g., a conductive sensing plane)). Due to the touch event, the additional charges will be stored, such that the total stored charge quantity will increase. The amount of the additional charges being stored depends on the voltage differences between the touched points and the corresponding locations of the sensor plane (i.e., the points on the sensor plane right below the touched points). By applying the various types of voltage fields, different amounts of the stored charge quantity can be measured and hence the touched positions can be determined.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A voltage-based capacitive touch device, comprising:
   a conductive sensing plane;
   a plurality of electrodes disposed on the conductive sensing panel respectively:
   a field generator unit coupled to the electrodes, the field generator unit being used for providing pre-determined driving signals to the electrodes, so as to form various types of voltage fields on the conductive sensing plane;
   a charge-storage measurement unit coupled to at least a part of the electrodes, the charge-storage measurement unit being used for measuring charge quantity stored on the conductive sensing plane and generating a plurality of charge-storage measurement results, the charge-storage measurement results corresponding to the charge quantity stored on the conductive sensing plane under various types of the voltage fields, each charge-storage measurement being performed at a different time point; and
   a position estimation unit, the position estimation unit being used for estimating whether or not a touch event occurs according to the charge-storage measurement results, and calculating touch input coordinates of the touch event according to the charge-storage measurement results if the touch event occurs;
   wherein the field generator unit comprises a static direct current driving circuit or a quasi-static direct current driving circuit coupled to the electrodes, the field generator unit generates various types of the voltage fields by adjusting driving voltages or driving currents from the static direct current driving circuit or the quasi-static direct current driving circuit to the electrodes, and connections between the electrodes and the static direct current driving circuit or the quasi-static direct current driving circuit are open when the charge-storage measurement unit performs the measurement.

2. The voltage-based capacitive touch device of claim 1, wherein the field generator unit builds at least two types of the voltage fields, and at least one type of the voltage field is established by allowing current flows among the electrodes.

3. The voltage-based capacitive touch device of claim 1, wherein the various types of the voltage fields are predetermined.

4. The voltage-based capacitive touch device of claim 1, wherein the voltage fields established by the field generator unit will become an equipotential field after the connections between the electrodes and the static direct current driving circuit or the quasi-static direct current driving circuit are open.

5. The voltage-based capacitive touch device of claim 1, wherein the electrodes are disposed on and around the conductive sensing plane respectively.

6. The voltage-based capacitive touch device of claim 1, wherein a sensing area of the conductive sensing plane is a complete electrically conductive plane without any etching process or conductive patterning process.

7. The voltage-based capacitive touch device of claim 1, wherein, in order to calculate the touch input coordinates of the touch event, at least two different types of the voltage fields are required, and the charge-storage measurement results corresponding to each voltage field at different time points are also required.

8. A touch sensing method suitable for a voltage-based capacitive touch device, the voltage-based capacitive touch device comprising a conductive sensing plane and a plurality of electrodes, the touch sensing method comprising:

providing pre-determined driving signals to the electrodes, so as to form various types of voltage fields on the conductive sensing plane;

measuring, at different time points, charge quantity stored on the conductive sensing plane under various types of the voltage fields, so as to generate a plurality of charge-storage measurement results; and estimating whether or not a touch event occurs according to the charge-storage measurement results, and calculating touch input coordinates of the touch event according to the charge-storage measurement results if the touch event occurs:

wherein the static direct current driving circuit or a guasi-static direct current driving circuit coupled to the electrodes is used for forming the voltage fields, the various types of the voltage fields are established by adjusting driving voltages or driving currents from the static direct current driving circuit or the guasi-static direct current driving circuit to the electrodes, and connections between the electrodes and the static direct current driving circuit or the guasi-static direct current driving circuit are open when the charge-strage measurement starts.

9. The touch sensing method of claim 8, wherein at least two types of the voltage fields are formed on the conductive sensing plane, and at least one type of the voltage field is established by allowing current flows among the electrodes.

10. The touch sensing method of claim 8, wherein the various types of the voltage fields are predetermined.

11. The touch sensing method of claim 8, wherein the originally established voltage field will become an equipotential field after the connections between the electrodes and the static direct current driving circuit or the quasi-static direct current driving circuit are open.

12. The touch sensing method of claim 8, wherein, in step of calculating the touch input coordinates of the touch event, at least two different types of the voltage fields are required, the charge-storage measurement results corresponding to each voltage field at different time points are also required.

\* \* \* \* \*